J. H. GREENSTREET.
BOX BLANK MACHINE.
APPLICATION FILED OCT. 4, 1909.

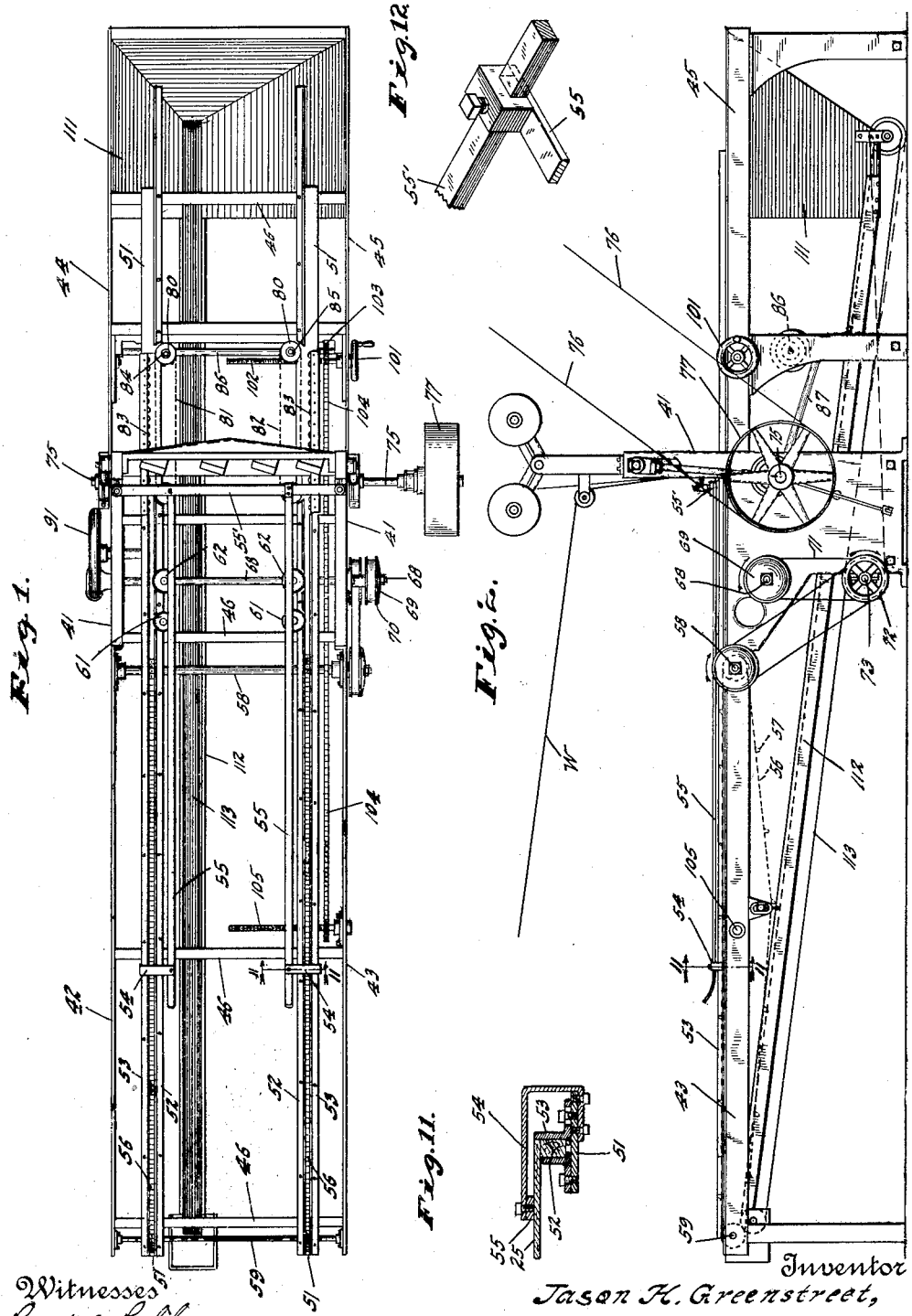

1,291,482.

Patented Jan. 14, 1919.
5 SHEETS—SHEET 2.

Witnesses
Frank A. Fahle
Thomas W. McMeans

Inventor
Jason H. Greenstreet,
By Bradford & Hood,
Attorneys

J. H. GREENSTREET.
BOX BLANK MACHINE.
APPLICATION FILED OCT. 4, 1909.
1,291,482.
Patented Jan. 14, 1919.
5 SHEETS—SHEET 3.
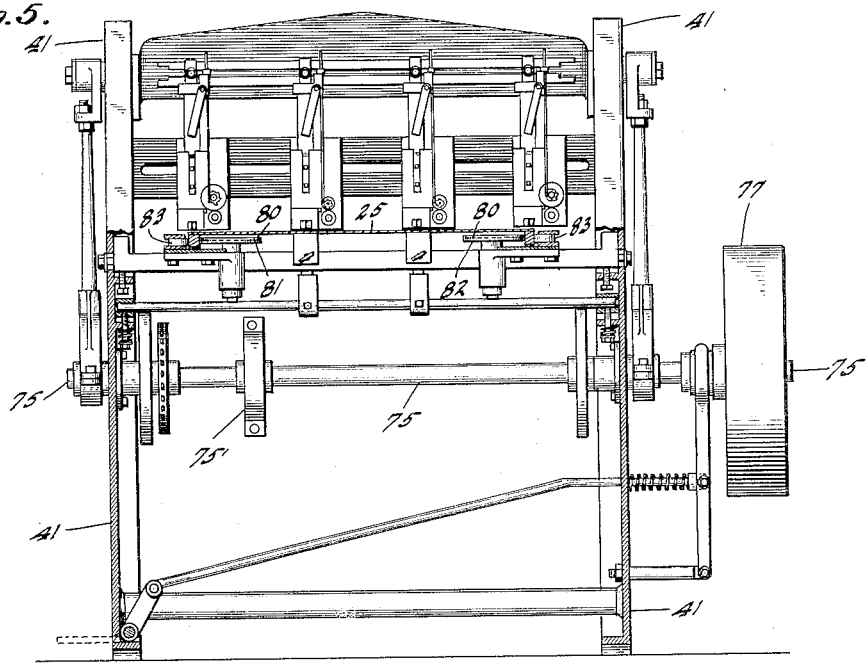
Fig. 5.
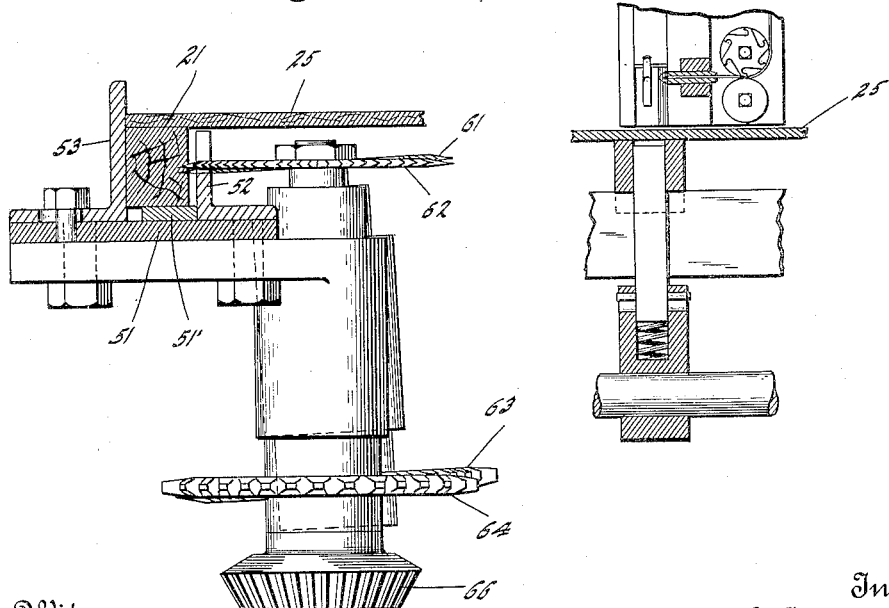
Fig. 6.
Fig. 7.
Witnesses
Frank A. Fahle
Thomas W. McMeans
Inventor
Jason H. Greenstreet,
By Bradford & Hood,
Attorneys

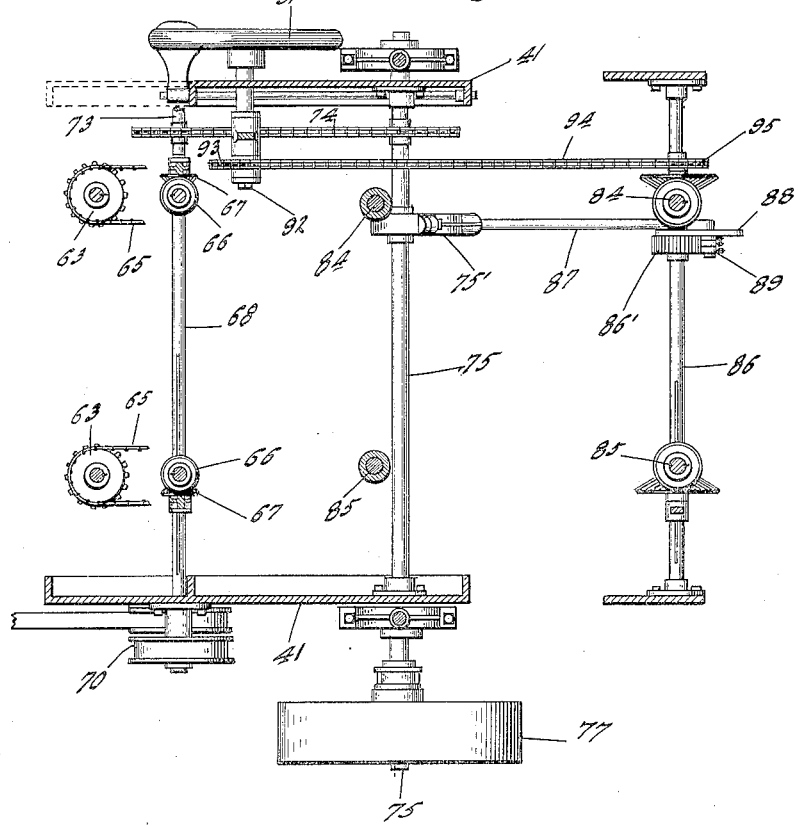
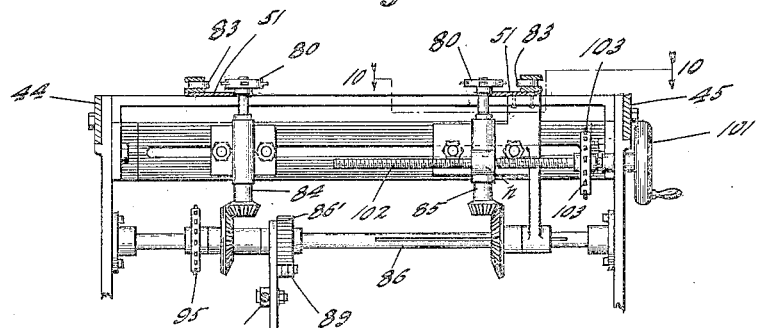
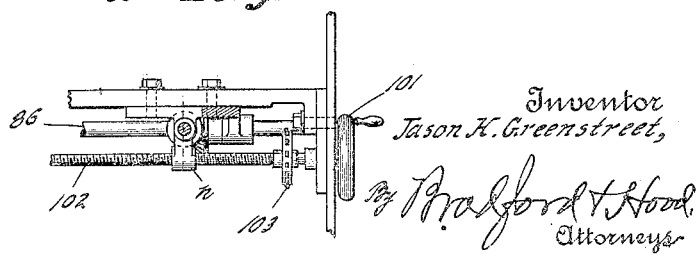

J. H. GREENSTREET.
BOX BLANK MACHINE.
APPLICATION FILED OCT. 4, 1909.
1,291,482.
Patented Jan. 14, 1919.
5 SHEETS—SHEET 5.
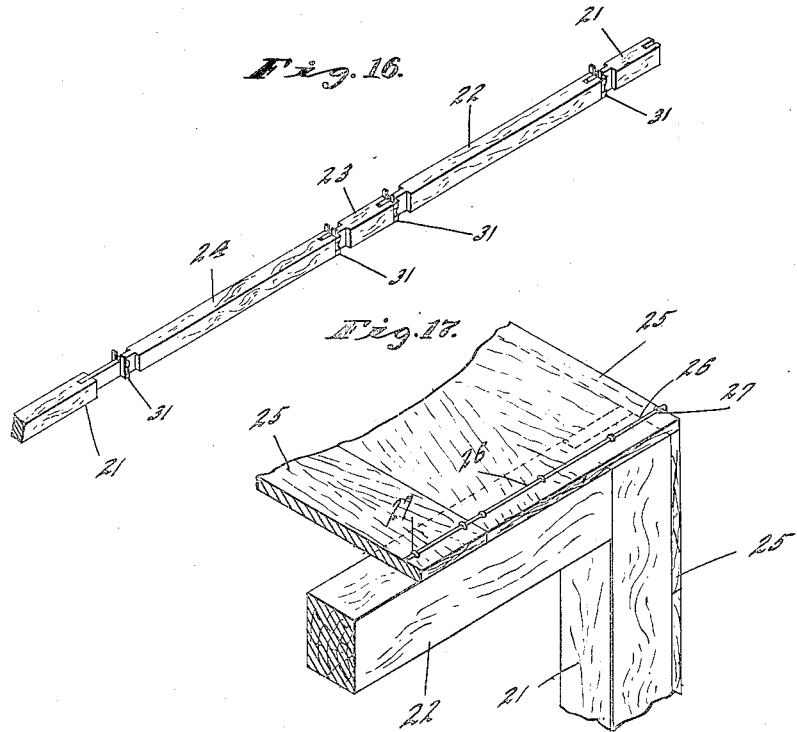
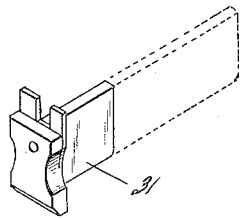
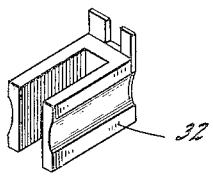
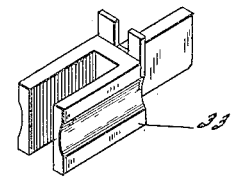
Witnesses
Frank A. Fahle
Thomas W. McMeans
Inventor
Jason H. Greenstreet,
By Bradford & Hood,
Attorneys

UNITED STATES PATENT OFFICE.

JASON H. GREENSTREET, OF INDIANAPOLIS, INDIANA, ASSIGNOR, BY MESNE ASSIGNMENTS, TO C. FRED YEGGE, TRUSTEE, OF EVANSTON, ILLINOIS.

BOX-BLANK MACHINE.

1,291,482.

Specification of Letters Patent.

Patented Jan. 14, 1919.

Application filed October 4, 1909. Serial No. 520,888.

*To all whom it may concern:*

Be it known that I, JASON H. GREENSTREET, a citizen of the United States, residing at Indianapolis, in the county of Marion and State of Indiana, have invented certain new and useful Improvements in Box-Blank Machines, of which the following is a specification.

The object of my present invention is to produce an efficient machine for forming boxes by means of wiring and stapling the sides, tops and bottoms to the ends, especially that class of boxes which are made of thin stock with the ends paneled. In many respects this machine is similar to that shown and described in Letters Patent No. 652,357 issued to Jason H. Greenstreet, June 26, 1900, especially in the wire-cutting and staple-driving mechanism, which are practically identical with those shown in said patent. The subject of the present invention is more especially the means of fitting and manipulating the stock of which the boxes are formed, as will be hereinafter more particularly described and claimed.

Figure 3:
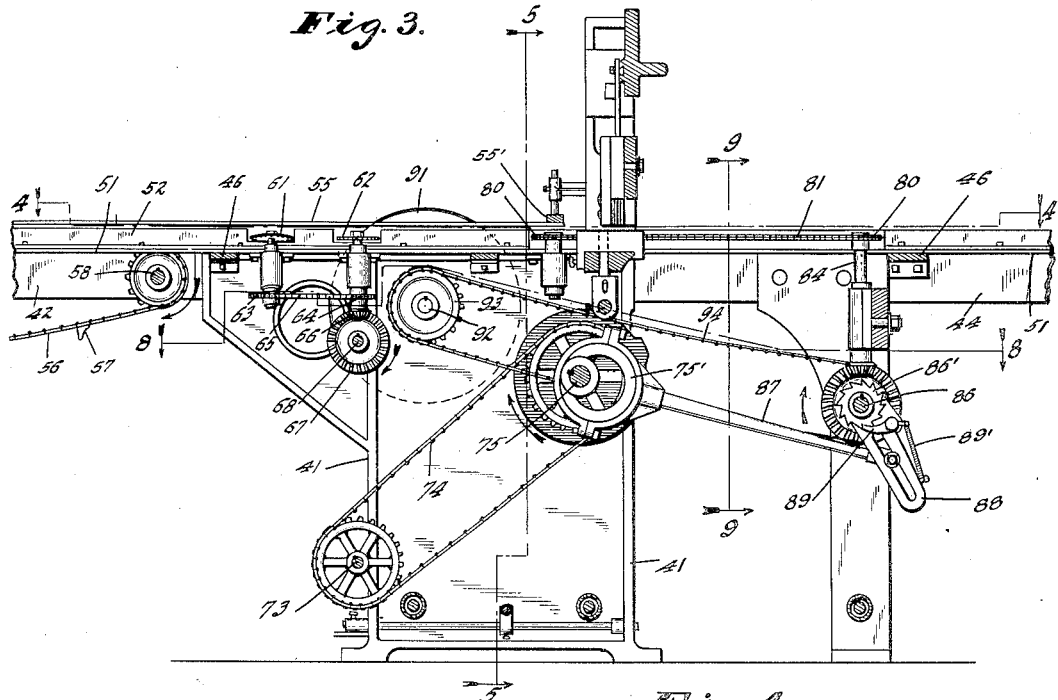
Figure 4:
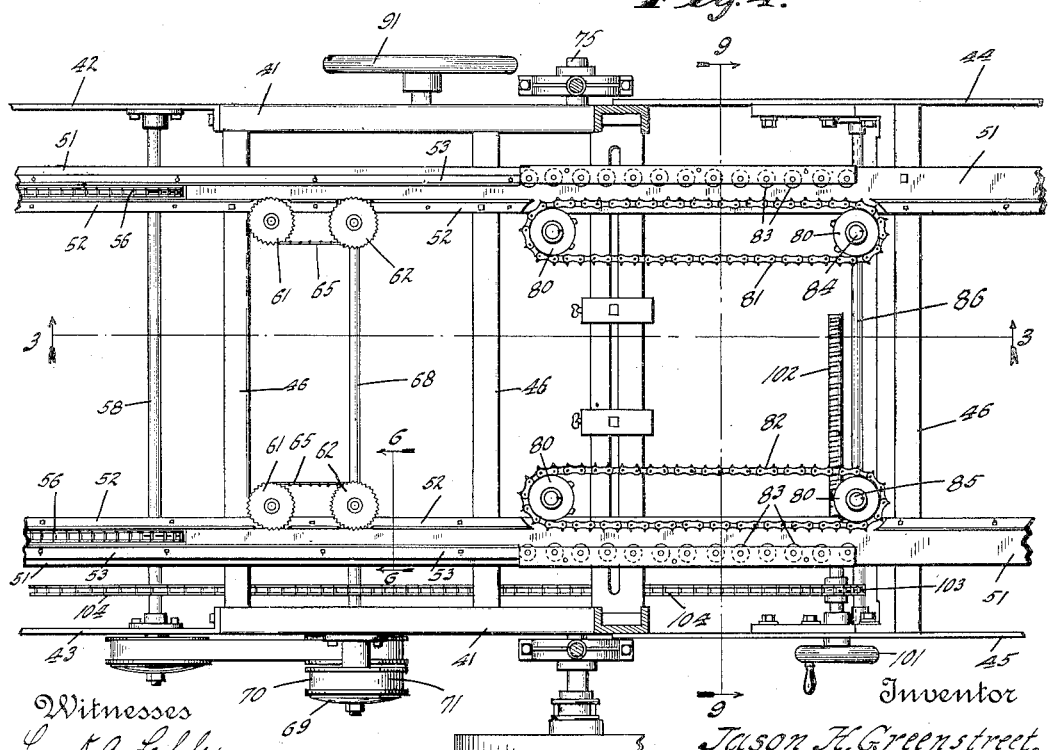

Referring to the accompanying drawings, which are made a part hereof and on which similar reference characters indicate similar parts, Figure 1 is a top or plan view of a machine embodying my present invention; Fig. 2 a side elevation thereof; Fig. 3 a vertical sectional view on an enlarged scale as seen when looking in the direction indicated by the arrows from the dotted line 3 3 in Fig. 4; Fig. 4 a view as seen when looking downwardly from the broken line 4 4 in Fig. 3, showing the central portion of the machine table and its stock feeding mechanism in plan; Fig. 5 a transverse vertical sectional view as seen when looking in the direction indicated by the arrows from the dotted line 5 5 in Fig. 3; Fig. 6 a detail view on a considerably enlarged scale as seen when looking in the direction indicated by the arrows from the broken line 6 6 in Fig. 4, illustrating one of the driving instrumentalities more clearly; Fig. 7 a detail view illustrating that portion of the machine where the staples are formed, driven and clenched; Fig. 8 a detail plan view of the train of shafts, gears and belts forming the driving mechanism as seen when looking downwardly from the broken line 8 8 in Fig. 3; Fig. 9 a transverse vertical sectional view as seen when looking in the direction indicated by the arrows from the broken line 9 9 in Figs. 3 and 4; Fig. 10 a detail view illustrating a portion of the construction more plainly as seen when looking downwardly from the broken line 10 10 in Fig. 9; Fig. 11 a detail transverse sectional view at the point indicated by the broken line 11 11 in Fig. 1; Fig. 12 a detail perspective view showing the mounting of the upper guide strip at the end near the stapling mechanism; Figs. 13, 14 and 15 perspective views of different forms of separators or spacing devices by means of which the cleats are held to proper relation while passing through the machine; Fig. 16 a perspective view of a row of such cleats with said spacing devices between them, and Fig. 17 a perspective view of one corner of the box structure which the form of machine illustrated is especially designed to produce.

The box structure in question is composed of cleats forming the edges of the ends, and suitable siding secured to said cleats. Each end has four cleats corresponding in length to the widths of the sides and bottom and top of the box. In Fig. 16 I have illustrated a set of these cleats in a box which is comparatively narrow in one of its dimensions, so that two of the cleats 21 and 23 are of considerably less length than the other two, 22 and 24. In Fig. 17 two cleats 21 and 22 are shown in their assembled condition,— that is at right angles with each other, and with the tongue-and-groove formation interlocked. Fragments of siding 25 are also shown as secured to said cleats in the manner in which that work is performed by my improved machine by means of the wires 26 and staples 27. In completing the box there are of course additional pieces of siding to form the panels completing the ends; but, as this is not a part of the work performed by my improved machine, it is not shown and will not be further described, it being merely mentioned at this point in order that the matter may not be misunderstood.

It will probably assist in giving an understanding of the operation of my improved machine to first describe how the material passes through it. The several cleats 21, 22, 23 and 24 are laid in proper succession end to end, in the guideways of the machine, and a distance block of appropriate form (being either of the form of block 31 shown in Fig. 13; of the form of block 32 shown in Fig. 14, or of the form of block 33 shown in Fig. 15) is interposed between the ends of adjacent cleats, so that the same are held in proper relation, and are permitted to turn and interlock at the proper time as shown in Fig. 17. Between each set of four cleats a longer distance block is inserted, so that the cleat 21 of the next set is held off a sufficient distance to permit the wires (one of these wires $w$ is shown in Fig. 2) to be cut and leave an end which can be twisted together with, or overlap, the preceding corresponding end, when the parts are brought together. This is illustrated at the left hand end of Fig. 16, where a fragment of the cleat 21 of a second set is shown spaced off to appropriate distance by the longer distance block. The additional length of distance block is indicated by the dotted lines in Fig. 13.

The complete machine is illustrated on a small scale in Figs. 1 and 2. The staple forming and driving mechanism is carried by a central frame 41, but is not illustrated in much detail, and will not be more than incidentally described herein, for the reason that it is substantially identical with that forming the subject-matter of the Greenstreet Patent No. 652,357 above referred to, although somewhat improved in form. Extending out in each direction from this central frame are suitable frame sides 42, 43, 44 and 45. Upon cross braces 46, extending between the sides 42 and 43, are guideways which receive the cleats which have been referred to, and along which said cleats and the box siding travel to the point where the stapling operation takes place. These guideways are each composed of a base plate 51 and two angle irons 52 and 53 secured thereon, one of said angle irons being of less height than the thickness of the cleats, while the other is of greater height, as is best shown in Figs. 6 and 11. The two angle irons 52 and 53 are adjustable toward and from each other in order to accommodate cleats of various thicknesses, and the guideways as a whole are adjustable toward and from each other on the supporting frame bars 46 in order to accommodate box structures of various sizes. As will be noticed, especially in Figs. 6 and 11, the sides 53 of the guideways form guides for the ends of the siding 25, as well as for the cleats 21, etc. A thin bar 51' is shown in the bottom of the guideway channel in Fig. 6. This is used when cleats of smaller dimensions than standard are being used, and is a mere filler or false bottom. As also best shown in Figs. 1, 2 and 11, overhanging arms 54 secured to the guideways carry overhead guiding bars 55 which prevent the siding from buckling or rising up during the feeding operation. The material is fed forward for the greater part of its travel by feed chains 56 having engaging points 57 and which run over sprocket wheels on the shafts 58 and 59.

When the material leaves the feeding chains 56 it engages with the pairs of serrated feeding disks 61 and 62, the points whereof engage with the inner faces of cleats 21, as best shown in Fig. 6. One of these disks is set on a somewhat inclined shaft, which gives it a tendency to pull downwardly on the material with which it engages, and the result is that the cleats 21 are drawn down closely onto the bottoms of the guides. The disk shafts are provided respectively with sprocket gear wheels 63 and 64, which are connected by sprocket chain 65, which drive one from the other. Upon the lower end of one of said shafts is a pinion 66, and this engages with a bevel gear wheel 67 on one of the machine shafts 68. Said shaft 68 has on its outer end a friction clutch, one member 69 of which is rigidly fixed thereto, and the other member 70 of which is in the form of a loose pulley. The pulley 70 is driven by a belt 71 (see Fig. 2) running from the corresponding pulley 72 on shaft 73, which said shaft 73 is directly below the shaft 68. Shaft 73 is driven through a sprocket belt 74 from main shaft 75, and the latter is driven in any suitable manner, as by belt 76 running to pulley 77 from any suitable source of power (not shown). The feeding disks 61 and 62, being in engagement with the cleats which are being fed forward, drive said cleats and the siding up to the position for the stapling operation, and hold them and the interposed spacing devices closely against each other, end to end. The forward movement of the material must however be intermittent (as will be presently explained) to enable the stapling to be performed, and the friction clutch device (consisting of parts 69 and 70) permits of a slippage at any time when the stopping of the movement of the material renders it necessary.

The final means for moving the material forward consists of a pair of spurred chains 81 and 82 which travel along the sides of the guideways beneath the stapling mechanism, and anti-friction rollers 83 mounted opposite said spurred chains. Said chains are carried by sprocket wheels 80 on vertical shafts 84 and 85, and these are driven by spur gears and pinions from a shaft 86 as is best shown in Fig. 9.

Shaft 86 is normally driven with a step-by-step movement from main shaft 75 by means of an eccentric 75' and a pitman 87 which is adjustably connected to a slotted arm 88 upon which is carried a pawl 89 which engages with a ratchet wheel 86' fixedly secured to shaft 86. Pawl 89 is held into engagement with ratchet wheel 86' by a spring 89'. The distance the shaft 86 shall move at each step is determined by the adjustment of the connection between pitman 87 and arm 88, as will be readily understood.

It frequently happens, however, on account of the varying widths of the siding which is to be fastened to the cleats, that the otherwise desirable regular movement should be varied from, in order that the staples or fastening devices may be driven into the siding forming the walls of the box at suitable distances from the edges thereof. To enable this to be properly done I provide a hand wheel 91 having a shaft 92 mounted in bearings at a suitable and convenient point on the machine, and one of the operatives constantly has a hand upon this wheel. Upon the inner end of this shaft 92 is mounted a sprocket wheel 93 from which a chain belt 94 runs to a corresponding sprocket wheel 95 on shaft 86. The operative, by turning hand wheel 91, either when the feeding devices are at rest, or when in operation at a somewhat greater speed than the ordinary motion of shaft 86, is capable of varying the movement of these final feeding devices, and thus bring the material to exactly the point below the stapling mechanism which is necessary to cause the staples to enter the wood at exactly the required point. This movement is commonly made just at the time the feeding devices have stopped their normal movement, and just before the stapling mechanism operates, whenever it is seen that the strip of siding to be stapled onto the cleats has not moved to just the point which is best.

As I have heretofore stated, one of the guideways and the accompanying feeding mechanism is adjustable toward and from the other, to accommodate box stock of varying lengths. As best shown in Figs. 4, 9 and 10, I have provided a hand wheel 101 having a screw 102 which engages with a nut $n$ fixedly connected to a portion of one of the guideway structures. There is also upon this screw or screw shaft a sprocket wheel 103, and a chain belt 104 leading thence to a corresponding sprocket wheel on a shaft 105 (see especially Fig. 1) near the other end of the machine, and which engages with a corresponding nut fixedly secured to the guideway structure at that point. As will be readily seen, turning the hand wheel 101 will move one entire guideway structure and the portion of the feeding mechanism carried thereby toward or from the other guideway structure, except that one of the top guiding bars 55 is secured at its inner end to a cross bar 55' by means of a set screw (see especially Figs. 1 and 12) and in order to move said bar 55 said set screw must be loosened and the movement performed by hand.

As is best shown in Figs. 1 and 2 I provide at the end of the machine from which the box material after it has been treated emerges, a hopper 111, from which an inclined trough 112 leads back to the opposite end of the machine. A carrier 113 runs in this trough. The lower or open end of the hopper is positioned immediately above the trough and carrier, so that the contents will discharge onto said carrier. This hopper is designed to receive the distance blocks (31, 32 or 33 according to which style is used) after they have performed their work; and, by means of said carrier, said distance blocks are continually carried back by the point of use, where an operative may conveniently get them for repeated use.

Having thus fully described my said invention, what I claim as new, and desire to secure by Letters Patent, is:—

1. The combination, in a box making machine, of two channeled guideways arranged to receive cleats laid end to end and also to receive siding laid upon said cleats, and mechanism by which the cleats and siding are driven forward consisting in part of vertically positioned shafts armed with serrated wheels which engage the inner sides of the cleats.

2. The combination in a box making machine, of two channeled guideways arranged to receive cleats laid end to end and also to receive siding laid upon said cleats, and mechanism by which the cleats and siding are driven forward consisting in part of vertically positioned shafts armed with serrated wheels which engage with the inner sides of the cleats, the shaft carrying one of said serrated wheels being inclined and thereby adapted to draw the cleats downwardly against the bottoms of the guideways.

3. The combination, in a box making machine, with the fastener-driving means, of conveying means for the material embodying two longitudinal guideways wherein the cleats of the box material rest, and spur wheels for driving said cleats forward the spurs whereof project into the guideways and engage with the cleats, the shafts of some of said spur wheels being inclined somewhat in respect to the others whereby the cleats are drawn firmly against the bottoms of the guideways.

4. The combination, in a box making machine, with the fastener-driving means, of conveying means for the material embodying two longitudinal guideways wherein the cleats of the box material rest, and spur wheels for driving said cleats forward the spurs whereof project into the guideways and engage with the cleats, the shafts of some of said spur wheels being inclined somewhat in respect to others whereby the cleats are drawn firmly against the bottoms of the guideways, said guideways being adjustable to receive various sized cleats.

5. In a box blank forming machine, the combination of stapling mechanism, cleat guides extending transversely of the plane of the stapling mechanism, primary feeding mechanism for progressing said cleats and associated sheets transversely across the stapling plane, preliminary cleat feeding mechanism arranged in conjunction with the receiving end of the cleat guide, means for driving said preliminary cleat feeding mechanism at a speed exceeding the speed of the primary feeding means, the said preliminary feeding mechanism and its driving means operating upon the cleats in such manner as to maintain a continuous but yielding driving force upon the cleats prior to their control by the primary feeding means, and spacing members independent of the primary feeding means and associated with the cleats prior to their control by the primary feeding means.

6. In a box blank forming machine, the combination of stapling mechanism, cleat guides extending transversely of the plane of the stapling mechanism, primary feeding mechanism for progressing said cleats and associated sheets transversely across the stapling plane, preliminary cleat feeding mechanism arranged in conjunction with the receiving end of the cleat guide, and means for driving said preliminary cleat feeding mechanism at a speed exceeding the speed of the primary feeding means, the said preliminary feeding mechanism and its driving means operating upon the cleats in such manner as to maintain a continuous but yielding driving force upon the cleats prior to their control by the primary feeding means.

7. In a box blank forming machine, the combination of stapling mechanism, a guide extending across the stapling plane and formed to receive and guide cleats and interspersed loose spacer blocks, a primary feeding means comprising an endless cleat-engaging chain associated with the guide to operate upon the inner faces of the cleats and arranged to progress the cleats and associated sheets across the stapling plane, a preliminary feeding means arranged in conjunction with the receiving end of the guide and engaging the cleats and interspersed spacer blocks with a yielding force having a speed exceeding the movement of the primary feeding means, to deliver cleats and interspersed spacer blocks to the primary feeding means, and a conveyer extending longitudinally of the machine with its receiving end beneath and beyond the cleat guide in position to receive loose spacer blocks as they drop from said guide and having its discharge end adjacent the receiving end of the cleat guide.

8. In a box blank forming machine, the combination of stapling mechanism, a guide extending across the stapling plane and formed to receive and guide cleats and interspersed loose spacer blocks, a primary feeding means comprising an endless cleat-engaging chain associated with the guide to operate upon the inner faces of the cleats and arranged to progress the cleats and associated sheets across the stapling plane, a preliminary feeding means arranged in conjunction with the receiving end of the guide and engaging the cleats and interspersed spacer blocks with a yielding force to deliver cleats and interspersed spacer blocks to the primary feeding means, and a conveyer extending longitudinally of the machine with its receiving end beneath and beyond the cleat guide in position to receive loose spacer blocks as they drop from said guide, and having its discharge end adjacent the receiving end of the cleat guide.

9. In a box blank forming machine, the combination of stapling mechanism, a guide extending across the stapling plane and formed to receive and guide cleats and interspersed loose spacer blocks, a primary feeding means arranged to progress the cleats and associated sheets across the stapling plane, and a preliminary feeding means arranged in conjunction with the receiving end of the guide and engaging the cleats and interspersed spacer blocks with a yielding force having a speed exceeding the movement of the primary feeding means, to deliver cleats and interspersed spacer blocks to the primary feeding means.

10. In a box blank forming machine, the combination of stapling mechanism, a guide extending across the stapling plane and formed to receive and guide cleats with interspersed spacer blocks, a preliminary-feeding means arranged in conjunction with the receiving end of the guide and engaging the cleats to advance them with a yielding force to deliver them to a primary feeling means, and the said primary feeding means, having its initial portion on the feed-side of the stapling plane, and arranged to progress the cleats and associated sheets across the stapling plane.

11. In a box blank forming machine, the combination of stapling mechanism, a guide extending across the stapling plane, primary feeding means comprising an endless cleat-engaging chain associated with the guide to operate upon the inner faces of the cleats and arranged to drive cleats and associated sheets across the stapling plane, a preliminary feeding chain arranged in conjunction with the receiving end of the cleat guide and provided with projections formed to engage cleats with interspersed loose spacer blocks and drive the same through the cleat guide to the primary feeding means, yielding driving means for yieldingly driving said preliminary feed chain at a speed exceeding the speed of the primary feeding means and a conveyer extending longitudinally of the machine with its receiving end below and beyond the discharge end of the cleat guide whereby the loose spacer blocks may drop thereto from the cleat guide, and its discharge end adjacent the receiving end of the cleat guide.

12. In a box blank forming machine, the combination of stapling mechanism, a guide extending across the stapling plane, primary feeding means arranged to drive cleats and associated sheets across the stapling plane, a preliminary feeding chain arranged in conjunction with the receiving end of the cleat guide and provided with projections formed to engage cleats and drive the same through the cleat guide to the primary feeding means, and yielding driving means for yieldingly driving said preliminary feed chain at a speed exceeding the speed of the primary feeding means.

13. In a box blank forming machine the combination of stapling mechanism, a work table extending transversely of the plane of the stapling mechanism, primary feeding mechanism for carrying the box material transversely across the stapling plane, preliminary feeding mechanism arranged in conjunction with the receiving end of the primary feeding mechanism, means for driving the primary feeding mechanism, and means for driving the preliminary feeding mechanism independently of the primary feeding mechanism in such manner that it may continuously deliver material to the primary feeding mechanism at a speed exceeding the concurrent speed of the primary feeding mechanism.

14. In a box blank forming machine, the combination of stapling mechanism, a cleat guide having a vertical wall along which cleats may be projected through the stapling plane, and an endless cleat-engaging feed chain arranged with one of its portions substantially parallel with said vertical wall of the cleat guide to drive the cleats along the guide by acting upon a face of the cleats other than a face to which the sheet material is to be attached.

15. In a box blank forming machine, the combination of stapling mechanism, a cleat guide having a vertical wall along which cleats may be driven through the stapling plane, a pair of wheels arranged adjacent said wall and spaced from each other along the cleat guide, and a cleat-engaging feed chain mounted upon said wheels in such position that one side of the chain lies substantially parallel to said wall of the cleat guide to engage a face of each cleat other than the face to which the sheet material is to be attached.

16. In a box blank forming machine, the combination of mechanism for attaching sheets to cleats, a cleat guide having a vertical wall along which cleats may be driven through the stapling plane, a pair of wheels arranged adjacent said wall and spaced from each other along the cleat guide, and a cleat-engaging feed chain mounted upon said wheels in such position that one side of the chain lies substantially parallel to said wall of the cleat guide to engage a face of each cleat other than the face to which the sheet material is to be attached.

17. A wirebound box blank machine comprising parallel cleat guides, mechanism for moving the cleats along in said guides, and means for wiring the sections of the blank together, said mechanism including link belts disposed between said guides, forming the inner sides thereof, provided with means for engaging the cleats, and operating in the common plane of said guides.

18. A wirebound box blank machine comprising parallel cleat guides, mechanism for moving the cleats along in said guides, and means for wiring the sections of the blank together, said mechanism including link belts disposed between said guides, forming the inner sides thereof, provided with means for engaging the cleats, and operating in the common plane of said guides, together with means whereby said cleat guides and link belts are adjustable toward and away from each other for blanks of different widths.

19. A wirebound box blank machine comprising parallel cleat guides, mechanism for moving the cleats along in said guides, and means for wiring the sections of the blank together, said mechanism including link belts disposed between said guides, forming the inner sides thereof, provided with means for engaging the cleats, and operating in the common plane of said guides, together with means for giving said link belts a step-by-step motion in such manner as to cause the outer or engaging portions of the belts to travel in the same direction.

20. A box blank machine comprising, in combination, mechanism including wiring means for operating upon blank materials to produce a blank, and material feeding means including means controlling the movement of an advanced portion of the materials relative to said mechanism and means yieldingly urging succeeding materials toward such advanced portion at a relatively faster rate, whereby blank materials in loose assembly are brought to proper blank-forming relationship as they feed to said mechanism.

21. A box blank machine comprising, in combination, mechanism including wiring means for operating upon blank materials to produce a blank, and a plurality of feeding devices for advancing such materials, said devices working at different speeds decreasing in the direction of movement of the work and coöperating to bring loosely assembled materials to proper blank-forming relationship and to feed them in such relationship to said mechanism.

22. A box blank machine comprising, in combination, mechanism including wiring means for operating upon blank materials to produce a blank, and a plurality of material feeding devices, certain of said devices assembling the materials into proper blank-forming relationship and certain of said devices effecting movement thereof at a relatively slower rate in passing the plane of action of said mechanism.

23. A box blank machine comprising, in combination, mechanism including wiring means for operating upon blank materials to produce a blank, and material feeding means constructed and arranged for effecting a controlled movement of the material in passing the plane of action of said mechanism and to bring succeeding materials to proper blank-forming relationship with proceeding materials before presentation to said mechanism.

24. A box blank machine comprising, in combination, mechanism including wiring means for operating upon blank materials to produce a blank, and successively acting blank-feeding means, a first of said means assembling loosely placed materials into proper blank-forming relationship and another of said means feeding them in such relationship to said mechanism.

25. A box blank machine comprising, in combination, mechanism including wiring means for operating upon blank materials to produce a blank; and means for feeding such materials thereto in proper assembled relationship, including a plurality of devices adapted for introduction in alternation with a succession of blank parts in loose assembly therewith, said devices adapted by coöperation with adjacent blank parts to relate them definitely to one another when said parts and devices are crowded into close assembly, and means for bringing such parts and interspersed devices into close assembly, and means for feeding such parts and devices in such close assembly to said mechanism.

26. A box blank machine comprising, in combination, mechanism including wiring means for operating upon blank materials to produce a blank; and means for feeding such materials thereto in proper assembled relationship, including a plurality of independently movable positioning devices adapted for successive introduction behind successively introduced blank parts, said devices adapted to have their relative positions determined by respective preceding blank parts and serving to determine the relative positions of respective blank parts next following, and a plurality of decrementally-speeded means operating to move said devices and blank parts up to one another and to feed them to said mechanism.

27. A box blank machine comprising, in combination, mechanism including wiring means for operating upon blank materials to produce a blank; work-feeding means; independently movable spacing or positioning devices adapted for introduction in alternation with successive blank parts in loose assembly; and preliminary feeding means for moving said parts and interspersed devices into close assembly in delivering them to said first mentioned feeding means.

28. A machine for producing foldable box-blanks by wiring together successive units of blank-forming material,—which comprises, in combination, wire-attaching mechanism; a work-guide for a succession of such units traversing the plane of action of said wire-attaching mechanism; and feeding means for advancing the work along said guide, including means for moving a preceding part of the work at a given rate for action of the wire-attaching mechanism thereon, and means for yieldingly forwarding succeeding work at a relatively faster rate, whereby successively introduced work units are automatically brought to proper relation to preceding work units for presentation to the wire-attaching mechanism.

29. A machine for making foldable box-blanks by wiring together successive units of blank-forming material,—which comprises, in combination, wire-attaching mechanism; a work-guide for a succession of such units traversing the plane of action of the wire-attaching machine; a plurality of spacing devices adapted to be successively positioned relative to the work, said devices having their relative positions determined by respective preceding work units and serving to determine the relative positions of respective succeeding units; and feeding means for advancing the work and interspersed spacing devices along said guide, including means for moving an advanced part of the work at a given rate for action of the wire-attaching machine thereon, and means yieldingly forwarding succeeding work at a relatively faster rate; whereby successively introduced work units are automatically brought to proper relation to preceding work units for presentation to the wire-attaching means.

30. A machine for making foldable box-blanks by wiring together successive units of blank-forming material,—which comprises, in combination, wire-attaching mechanism; a work-guide for a succession of such units traversing the plane of action of the wire-attaching mechanism; a plurality of spacing devices adapted to be successively positioned relative to the work, said devices having their relative positions determined by respective preceding work units and serving to determine the relative positions of respective succeeding units; and a plurality of coöperating work-feeding devices, certain of said devices effecting a given rate of movement of the work in passing the wire-attaching mechanism and other of said devices yieldingly urging oncoming work units at a relatively faster rate.

31. A box-blank machine comprising, in combination means for feeding and controlling the movement of assembled blank materials including successive cleats in coöperative foldable relationship and side material placed thereon; mechanism adapted by successive operations upon the advancing materials to secure said materials together and attach continuous binding wire thereto; and preliminary cleat-feeding means for receiving successively introduced cleats and advancing them to coöperative foldable relationship to previously introduced cleats, said preliminary feeding means yieldingly urging the cleats at a relatively faster rate than the rate of movement of the assembled materials controlled by the first mentioned feeding means.

32. A box-blank machine comprising, in combination, mechanism to secure together and attach continuous binding wires to assembled blank materials including successive cleats in coöperative foldable relationship; and a plurality of feeding devices and associated work guiding means; certain of said feeding devices effecting a positive feed of the assembled materials past said securing and wire attaching mechanism, and other of said devices yieldingly advancing succeeding cleats at a relatively faster rate to bring them to coöperative foldable relationship to the preceding cleats moving at said first mentioned rate.

33. A box-blank machine comprising, in combination, wiring and fastener-setting mechanism adapted for successive operations upon progressively submitted cleats and side material placed on said cleats; preliminary feeding means for bringing a succession of cleats into coöperative foldable relationship preparatory to a positive feed; and positive feeding means controlling movement of the cleats and associated side material relative to said wiring and fastener-setting mechanism; said preliminary feeding means coöperating with said positive feeding means for feeding successively introduced materials in proper relationship through the machine.

34. A box-blank machine comprising, in combination, wiring and fastener-setting mechanism; guiding means for a succession of cleats; and work-feeding means comprising a plurality of successively acting devices for assembling said cleats into coöperative foldable relationship and moving them in such relationship at a controlled rate relative to said wiring and fastener-setting mechanism.

35. A box-blank machine comprising, in combination, cleat guides for a succession of cleats and interspersed spacing devices in loose relationship; mechanism for securing said cleats to sheet material placed thereon and attaching binding wire; and successively acting feeding devices, the first for bringing said cleats into coöperative foldable relationship, and the second for advancing such related cleats with associated side material for action of the securing and wire attaching mechanism thereon.

In witness whereof I have hereunto set my hand and seal at Indianapolis, Indiana, this first day of October, A. D. one thousand nine hundred and nine.

JASON H. GREENSTREET. [L. S.]

Witnesses:
CHESTER BRADFORD,
FRANK A. FAHLE.